UNITED STATES PATENT OFFICE 2,522,349

UREA ALDEHYDE MODIFIED RUBBER

James D. D'Ianni, Akron, Ohio, assignor to Wingfoot Corporation, Akron, Ohio, a corporation of Delaware No Drawing. Application November 19, 1946, Serial No. 710,951

9 Claims. (Cl. 260—3)

This invention relates to rubber derivatives, to methods for their preparation and to the use thereof. More particularly, it relates to materials prepared by reacting rubber with an aldehyde and a urea.

One object of the invention is to produce rubber derivatives which are useful for a wide variety of purposes. Another object of the invention is to provide methods for preparing these rubber derivatives. Another object of the invention is to provide a method for employing these rubber derivatives as adhesives and particularly to provide a method for securing the adhesion of rubber to cellulose, cellulose derivatives and other materials with the production of laminated products having outstanding physical characteristics. Other objects and advantages will appear as the description proceeds.

According to the invention, rubber, an aldehyde and a urea are caused to react, using a condensation catalyst, to produce rubber derivatives which may be used for molding, coating and other purposes and are particularly useful as adhesives.

Although it is recognized that urea-formaldehyde resins are generally incompatible with rubber, it has now been found that if urea and formaldehyde are reacted separately with rubber and the resulting products are brought together, a compatible union is obtained. Alternatively, if desired, an aldehyde-rubber derivative may be further treated with a urea or a urea-rubber derivative may be further treated with an aldehyde.

The reaction of rubber with a urea is illustrated by the following examples.

Example 1

Five hundred grams of dead milled rubber and 100 grams of urea were thoroughly mixed in a small dough mixer and then 25 ml. of a 40% solution of boron fluoride in ether was added dropwise over a period of 2-3 minutes. The mixture was then heated to 60-70° C. for 2 hours with continued mixing, the mass becoming homogeneous and quite plastic. The product, which weighed 614 grams, was washed with water on a washing mill and dried. Six grams of phenyl-beta-naphthylamine were then milled into the product for the purpose of retarding oxidation. The final product weighed 606 grams and was a sticky, brown, apparently homogeneous mass. It was still somewhat rubber-like and was easily sheeted out on a rubber mill.

Example 2

A mixture of 500 grams of dead milled rubber and 100 grams of thiourea was placed in a small dough mixer and masticated until homogeneous, after which 25 ml. of a 40% solution of boron fluoride in ether was added over 2-3 minutes, and the resultant mixture was heated and masticated at 60-70° C. for 2 hours. The product, which weighed 610 grams, was quite similar to the product of Example 1. One percent of phenyl-beta-naphthylamine based on the weight of the product was then milled into the product.

While urea and thiourea are preferred materials, various other ureas may also be employed in the invention, the broad class being typified by the structural formula

in which X is selected from the group consisting of oxygen, sulfur and selenium and in which at least one R is hydrogen and the remaining R's are selected from the group consisting of alkyl, aryl, alicyclic and aralkyl radicals.

Further examples of ureas which may be used are sym. dimethyl urea, monomethyl urea, monoethyl urea, N-methyl-N'-ethyl urea, sym. diethyl urea, unsym. diethyl urea, triethyl urea, allyl urea, diallyl urea, phenyl urea, N-phenyl-N'-tolyl urea, N-ethyl-N'-phenyl urea, sym. diphenyl urea, unsym. diphenyl urea, triphenyl urea, benzyl urea, sym. dibenzyl urea, unsym. dibenzyl urea, tribenzyl urea, phenethyl urea, N-phenyl-N'-methyl-N'-phenyl urea, N-phenyl-N'-ethyl-N'-phenyl urea, N-methyl-N-phenyl urea, N-ethyl-N-tolyl urea, cyclohexyl urea, sym. dicyclohexyl urea, N-methyl-N',N'-pentamethylene urea, N,N'-hexamethylene urea, N-methyl-N'-decahydronaphthyl urea, N-phenyl-N'-benzyl urea, N-methyl-N'-dibenzyl urea, N-cyclohexyl-N'-benzyl urea, N-cyclohexyl-N'-diethyl urea, N-naphthyl-N'-dicyclohexyl urea, and corresponding thio and seleno ureas. The preferred class is compounds in which at least two of the R's in the structural formula are hydrogen.

The reaction of rubber with an aldehyde is illustrated by the following examples.

Example 3

One gram of a 40% solution of boron fluoride in ether diluted with 10 ml. of benzol was added slowly, with stirring, to a mixture consisting of 100 grams of a 15% rubber cement in benzol, 3 grams of paraformaldehyde and 250 ml. of benzol, the mixture being maintained at reflux temperature during the addition. The mixture quickly gelled out but, on standing three weeks in diffused daylight, it reverted largely to the sol state.

*Example 4*

A mixture of 600 grams of dead milled rubber and 120 grams of paraformaldehyde was masticated in a small dough mixer while 30 ml. of a solution of boron fluoride in ether was added slowly over a period of 2–3 minutes. The mixing was then continued for about one hour at a temperature of about 60–70° C. The crude product, which weighed 721 grams, could be milled, calendered into sheet form, or dissolved in benzol. When the crude product was dissolved in benzol, it set to a gell, probably due to the continued presence of boron fluoride. Therefore, it is preferable to wash the product with warm water on a washing mill and dry it before dissolving, since this gives a more satisfactory cement with greater stability.

Of the aldehydes which may be employed, formaldehyde is the preferred material. It may be used in the form of formaldehyde itself or in any of those forms which are generally recognized to be equivalents, e. g. paraformaldehyde, trioxane, etc. Other aldehydes may also be used, such as acetaldehyde, propionaldehyde, butyraldehyde, furfural and benzaldehyde, the aliphatic aldehydes being preferred.

Although boron fluoride is a preferred catalyst, other condensation catalysts may also be employed to promote the formation of the rubber derivatives. The condensation catalyst apparently produces some condensation or cyclization of the rubber molecules. In addition, the rubber reacts with the urea or aldehyde to produce a complex product involving addition to or condensation with the added material. Thus, in general, any condensation catalyst which will cause condensation or cyclization of the rubber molecules may be used. The halides of the amphoteric metals are a preferred class. Further examples are sulfuric acid, phenol sulfonic acid, toluene sulfonic acid, various chlorsulfonic acids, aluminum chloride, ferric chloride, chromic chloride and others well known in the art.

The conditions of the reaction in preparing the rubber derivatives will vary with the choice of catalyst and starting materials. For example, boron fluoride causes a relatively rapid reaction while a mixture of zinc chloride and glacial acetic acid is slower. In general, the temperature will be in the range from 15 to 125° C. The time of reaction may be as short as 15 minutes or as long or 3 or 4 hours. The aldehyde and urea may be used in widely varying proportions, 20–50% based on the rubber having been found to be satisfactory, quantities from 10–35% actually being retained by the rubber.

The preparation of the conjoint product of urea, formaldehyde and rubber is illustrated by the following example.

*Example 5*

The urea derivative of rubber is prepared as illustrated in Example 1 and the formaldehyde derivative of rubber is prepared as illustrated in Example 3. A cement containing both of these materials may be prepared and heated to cause the two rubber derivatives to interact, or, if desired, the cement may be applied to an article to be coated or rendered adhesive and reacted in situ. For example, a rayon cord was dipped into a benzol cement containing 2½% of the reaction product of urea and rubber and 3% of the reaction product of formaldehyde and rubber. After drying, the treated cord was vulcanized in a mass of rubber for 10 minutes at 290° F. The adhesion between the rubber and treated rayon was 18.2 pounds as compared with rubber-to-rayon adhesions of 8–9 pounds when the rayon cord was treated with either of the rubber derivatives separately or with ordinary rubber cement and tested under the same conditions.

While formaldehyde (and its analogs), and urea and thiourea are the preferred materials in preparing this conjoint type of product, the same variations are possible as are indicated in the preceding examples and description.

The rubber derivatives described are useful for many purposes but they are particularly advantageous in the preparation of adhesives and are eminently suitable for use in laminating rubber to cellulosic products, the latter type of lamination often giving considerable difficulty, especially when the cellulose is in regenerated form, as in rayon or cellophane. In using the derivatives in the lamination of rubber to cellulose, it is sometimes, though not always, desirable to employ them in conjunction with an organic diisocyanate, this procedure being especially advantageous when the cellulose is in regenerated form. The product of Example 5 is outstanding in its adhesive properties and may be employed without the use of a diisocyanate with almost equally good results. Various diisocyanates, either aromatic or aliphatic, may be used. Illustrative examples are para-phenylene diisocyanate, meta-phenylene diisocyanate, the diphenylene diisocyanates, methylene di(p-phenylene isocyanate), ethylene di(oxy trimethylene isocyanate), and the diisocyanates of dipropyl ethers. Methylene di(p-phenylene isocyanate) gives outstanding results, may be prepared from readily available materials and constitutes a preferred example. If desired, the cellulose may be treated with the diisocyanate and thereafter treated with the rubber derivative and then laminated to rubber or, if desired, the diisocyanate may be added to the solution of the rubber derivative and the cellulose coated with the mixture. From the practical standpoint, the latter procedure is preferred and it has been found that particularly good results are obtained if a cement containing the rubber derivative and the diisocyanate is prepared and allowed to stand before use, for example for about 24–48 hours.

The use of the adhesive compositions has been particularly described in connection with the lamination of regenerated cellulose to rubber since this is an especially difficult problem which emphasizes the merit of the invention, but the adhesives are also excellent for securing natural cellulose, such as cotton cord, to rubber and for securing rubber to cellulose derivatives and to glass fibers and for other purposes.

This application is a continuation-in-part of my copending application Serial No. 407,604, filed August 20, 1941 and now abandoned.

I claim:

1. The process which comprises reacting 100 parts of rubber with 20–50 parts of a urea in the presence of a condensation catalyst for rubber, reacting 100 parts of rubber with 20–50 parts of an aldehyde in the presence of a condensation catalyst for rubber and then interreacting said urea-rubber with said aldehyde-rubber.

2. The process which comprises reacting 100 parts of rubber with 20-50 parts of an aldehyde in the presence of a condensation catalyst for rubber and then reacting said aldehyde-rubber with a urea.

3. The process which comprises reacting 100 parts of rubber with 20-50 parts of a urea in the presence of a condensation catalyst for rubber and then reacting said urea-rubber with an aldehyde.

4. The process which comprises reacting 100 parts of rubber with 20-50 parts of urea in the presence of a condensation catalyst for rubber, reacting 100 parts of rubber with 20-50 parts of formaldehyde in the presence of a condensation catalyst for rubber and then interreacting said urea-rubber with said formaldehyde-rubber.

5. The product prepared according to the process of claim 1.

6. The product prepared acording to the process of claim 2.

7. The product prepared according to the process of claim 3.

8. The product prepared according to the process of claim 4.

9. The product prepared by reacting 200 parts of rubber with 20-50 parts of a urea and 20-50 parts of an aldehyde in the presence of a condensation catalyst for rubber.

JAMES D. D'IANNI.

REFERENCES CITED

The following references are of record in the file of this patent:

UNITED STATES PATENTS

| Number | Name | Date |
|---|---|---|
| 2,356,564 | Chomette et al. | Aug. 22, 1944 |